(12) United States Patent
Naito et al.

(10) Patent No.: US 10,577,261 B2
(45) Date of Patent: Mar. 3, 2020

(54) WATER TREATMENT APPARATUS AND WATER TREATMENT METHOD

(71) Applicant: Mitsubishi Electric Corporation, Chiyoda-ku (JP)

(72) Inventors: Teruki Naito, Chiyoda-ku (JP); Gaku Oinuma, Chiyoda-ku (JP); Yasutaka Inanaga, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 141 days.

(21) Appl. No.: 15/765,422

(22) PCT Filed: Aug. 30, 2016

(86) PCT No.: PCT/JP2016/075341
§ 371 (c)(1),
(2) Date: Apr. 2, 2018

(87) PCT Pub. No.: WO2017/094301
PCT Pub. Date: Jun. 8, 2017

(65) Prior Publication Data
US 2019/0031539 A1    Jan. 31, 2019

(30) Foreign Application Priority Data

Dec. 4, 2015    (JP) ................ 2015-237460

(51) Int. Cl.
*C02F 1/46*    (2006.01)
*C02F 1/48*    (2006.01)
(Continued)

(52) U.S. Cl.
CPC ........ *C02F 1/4608* (2013.01); *C02F 1/46104* (2013.01); *C02F 1/48* (2013.01);
(Continued)

(58) Field of Classification Search
CPC .. C02F 1/00; C02F 1/46; C02F 1/4608; C02F 1/461; C02F 1/46104; C02F 1/467;
(Continued)

(56) References Cited

U.S. PATENT DOCUMENTS

2004/0084382 A1    5/2004  Ryazanova et al.
2010/0240943 A1    9/2010  Solnik et al.

FOREIGN PATENT DOCUMENTS

JP    2003-71460 A    3/2003
JP    2007-307486 A    11/2007
(Continued)

OTHER PUBLICATIONS

Oinuma G., et al., "Comparison of Aqueous Organics Degradation by Plasma on Flowing Water Surface and $O_3/H_2O_2$ Advanced Oxidation Process", In Proc. $23^{rd}$ International symposium on Plasma Chemistry, Aug. 1, 2017, 2 pages.
(Continued)

*Primary Examiner* — Natasha E Young
(74) *Attorney, Agent, or Firm* — Oblon, McClelland, Maier & Neustadt, L.L.P.

(57) ABSTRACT

A water treatment apparatus includes: a trough-shaped flow path portion (2) on which treatment target water (W) flows; a high-voltage portion (3) having a plurality of high-voltage electrodes (4) disposed above the flow path portion (2) spacing therebetween in a direction orthogonal to a direction in which the treatment target water (W) flows; and an electric field relaxation portion (5) having first members (6) and second members (7) provided so as to extend around the high-voltage portion (3). Water treatment is performed by applying a high voltage from a pulse power supply (8) to the high-voltage portion (3), the first members (6), and the second members (7) in order to generate electric discharge between the high-voltage electrodes (4) and the flow path
(Continued)

portion (2). And water treatment is performed by dissolving generated active species such as ozone and hydroxyl radicals into the treatment target water.

20 Claims, 10 Drawing Sheets

(51) Int. Cl.
*C02F 1/461* (2006.01)
*C02F 1/467* (2006.01)

(52) U.S. Cl.
CPC ...... *C02F 1/4672* (2013.01); *C02F 2201/002* (2013.01); *C02F 2201/4611* (2013.01); *C02F 2201/4616* (2013.01); *C02F 2201/46175* (2013.01); *C02F 2201/48* (2013.01); *C02F 2305/023* (2013.01)

(58) Field of Classification Search
CPC ...... C02F 1/4672; C02F 1/48; C02F 2201/00; C02F 2201/002; C02F 2201/46–4611; C02F 2201/48; C02F 2305/00–023
See application file for complete search history.

(56) References Cited

FOREIGN PATENT DOCUMENTS

| | | | |
|---|---|---|---|
| JP | 2012-236130 A | 12/2012 | |
| JP | 2013-31801 A | 2/2013 | |
| JP | 2013-208523 A | 10/2013 | |
| JP | 5819031 B1 | 11/2015 | |
| WO | WO-2014188078 A1 * | 11/2014 | ............ C02F 1/4608 |
| WO | 2015/111465 A1 | 7/2015 | |
| WO | 2016/117259 A1 | 7/2016 | |
| WO | 2016/117260 A1 | 7/2016 | |

OTHER PUBLICATIONS

Japanese Office Action dated Mar. 7, 2017 issued in Japanese Patent Application No. 2016-574192, (with English translation), 5 pages.
International Search Report dated Nov. 1, 2016 in PCT/JP2016/075341 filed Aug. 30, 2016.

* cited by examiner

WATER TREATMENT APPARATUS AND WATER TREATMENT METHOD

This application is a national stage application claiming priority to PCT/JP2016/075341, now WO2017/094301, filed on Aug. 30, 2016, which claims priority to Japanese Patent Application Serial No. JP2015-237460, filed on Dec. 4, 2015.

TECHNICAL FIELD

The present invention relates to a water treatment apparatus for treating treatment target water by using active species generated by electric discharge, such as ozone and radicals, and a water treatment method.

BACKGROUND ART

Hitherto, in treatment of water supply and sewage, ozone and chlorine have been generally used. However, industrial waste water, recycled water, and the like may contain persistent substances that cannot be decomposed by ozone or chlorine. In particular, removal of dioxins, dioxane, and the like is a big issue. In some sites, a method has been put into practical use, in which ozone ($O_3$) and hydrogen peroxide ($H_2O_2$) or ultraviolet rays are combined to generate hydroxyl radicals (OH radicals) having higher activity than $O_3$ and chlorine, in treatment target water, thereby persistent substances are removed. However, the apparatus cost and the operating cost for this method are very high, and thus this method has not been popularized to a large extent. Therefore, a method in which persistent substances are removed with high efficiency by causing OH radicals generated by electric discharge to act directly on treatment target water, has been considered.

As a water treatment apparatus that performs such water treatment, an apparatus has been known which includes: treatment means having a structure of layers each having a reaction vessel capable of storing treatment target water therein and pin-shaped electrodes that generate electric discharge for performing electric discharge radical treatment on the treatment target water; and power supply means for applying a high voltage to the electrodes (see, for example, Patent Document 1). According to such a radical treatment system, it is possible to improve the decomposition efficiency of persistent substances dissolved in water, by using radicals.

CITATION LIST

Patent Document

Patent Document 1: Japanese Laid-Open Patent Publication No. 2007-307486 (pages 4 and 5, FIG. 1)

SUMMARY OF THE INVENTION

Problems to be Solved by the Invention

The conventional water treatment apparatus is configured as described above, active species generated by electric discharge, such as ozone ($O_3$) and hydroxyl radicals (OH radicals) are dissolved into treatment target water, and persistent substances are decomposed by using the active species. Thus, in order to treat treatment target water at high speed, it is necessary to uniformly form electric discharge on a wide area of the surface of the treatment target water to increase the amount of active species to be supplied into the treatment target water. However, in the case where an electrode having an electric discharge portion having a long shape such as a wire or a ribbon is used to uniformly form electric discharge on a wide area of the surface of the treatment target water, an electric field at an end portion of the electrode becomes stronger than an electric field inside the electrode. Thus there is a problem that electric discharge is concentrated at the end portion of the electrode, so that electric discharge cannot be uniformly formed on the surface of the treatment target water. In addition, in the case where a plurality of electrodes are arranged in order to uniformly form electric discharge on a wide area of the surface of the treatment target water, an electric field at the electrode located at each end of the arrangement becomes stronger than electric field at the electrodes located at the inner side of the arrangement. Thus there is a problem that electric discharge is concentrated at the electrode located at each end of the arrangement, so that electric discharge cannot be uniformly formed on the surface of the treatment target water. Moreover, in the case where the reaction vessel is formed by a conductive material, when the reaction vessel and the electrode are disposed adjacently, electric discharge occurs between the reaction vessel and the electrode. It is necessary to increase the distance between the reaction vessel and the electrode in order to suppress electric discharge between the reaction vessel and the electrode, and thus there is a problem that electric discharge cannot be formed on the surface of the treatment target water near the wall surface of the reaction vessel. Furthermore, even in the case where an insulator is provided on the wall of the reaction vessel in order to suppress electric discharge between the reaction vessel and the electrode, the surface of the insulator becomes conductive due to condensation thereon, and thus there is a problem that electric discharge occurs between the reaction vessel and the electrode, so that electric discharge cannot be uniformly formed on the surface of the treatment target water. Moreover, in the case where a ground electrode is provided in the treatment target water and the reaction vessel is formed by an insulator, there is a problem that electric discharge can be formed only in the range of the ground electrode, so that electric discharge cannot be uniformly formed on the surface of the treatment target water. As a result, the conventional water treatment apparatus has a problem that the water treatment apparatus cannot increase the amount of active species to be supplied into the treatment target water and thus cannot treat the treatment target water at high speed.

The present invention has been made to solve the above-described problems, and an object of the present invention is to obtain a water treatment apparatus that can uniformly form electric discharge and that can treat treatment target water at high speed, and to provide a water treatment method that can treat treatment target water at high speed.

Means of Solution to the Problems

A water treatment apparatus according to the present invention is a water treatment apparatus for performing water treatment by forming an electric field between a flow path portion on which treatment target water flows and a voltage application portion to which a high voltage is applied, and by generating electric discharge between the voltage application portion and the flow path portion. The water treatment apparatus includes an electric field relaxation portion disposed at an outer periphery of the voltage application portion so as to oppose the flow path portion and configured to form the electric field between the electric field relaxation portion and the flow path portion, and a power supply for applying a voltage to the voltage application portion and the electric field relaxation portion.

The electric field formed by the electric field relaxation portion when the voltage is applied is smaller than the electric field formed by the voltage application portion when the voltage is applied.

A water treatment method according to the present invention is a water treatment method for performing water treatment by using the above water treatment apparatus. The water treatment method is performed by forming electric discharge between the voltage application portion and the flow path portion while causing the treatment target water to flow on the flow path portion, by bringing the treatment target water into contact with the electric discharge, by supplying active species generated by the electric discharge into the treatment target water, and by treating the treatment target water by the active species supplied into the treatment target water.

Effect of the Invention

In the water treatment apparatus according to the present invention, a voltage application portion configured to form electric discharge between the voltage application portion and a flow path portion is disposed, and an electric field relaxation portion is provided at the outer periphery of the voltage application portion so as to oppose the flow path portion. Thus, it is possible to obtain a water treatment apparatus that can uniformly form electric discharge and that can treat treatment target water at high speed.

In the water treatment method according to the present invention, water treatment is performed by using the water treatment apparatus in which the voltage application portion configured to form electric discharge between the voltage application portion and the flow path portion is disposed and the electric field relaxation portion is provided at the outer periphery of the voltage application portion so as to oppose the flow path portion. Thus, it is possible to provide a water treatment method that can treat treatment target water at high speed.

EMBODIMENTS FOR CARRYING OUT THE INVENTION

Embodiment 1

Figure 1:
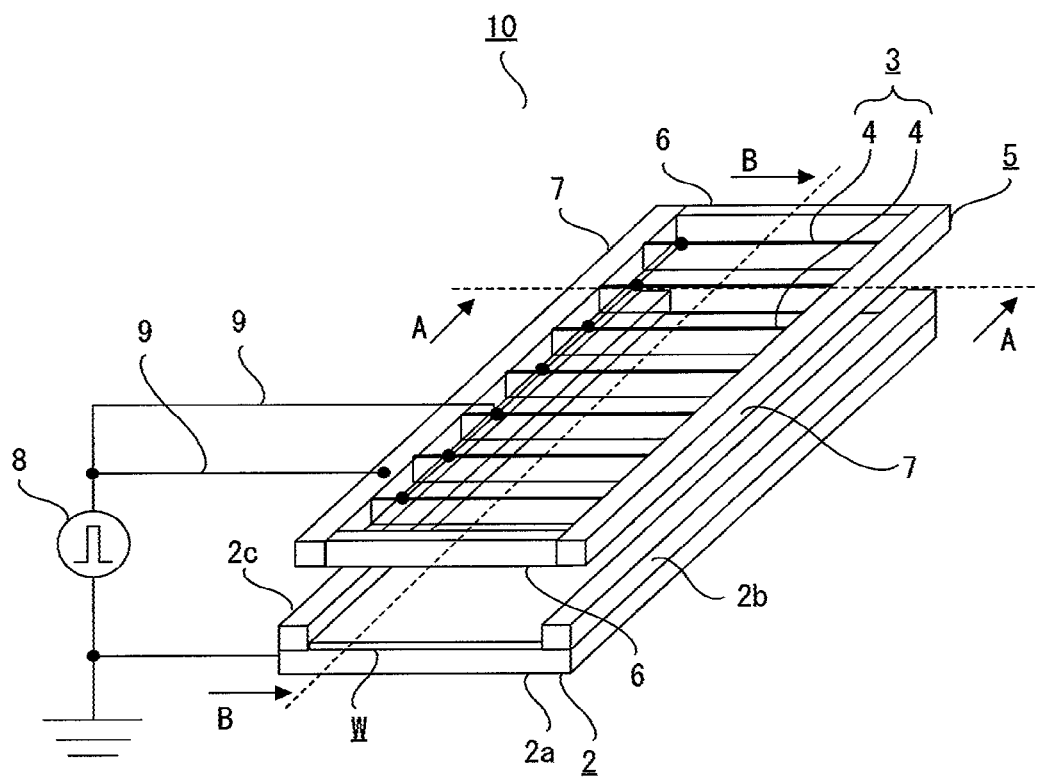
FIG. 1 is a configuration diagram showing the configuration of a water treatment apparatus according to Embodiment 1 of the present invention.
Figure 2A:
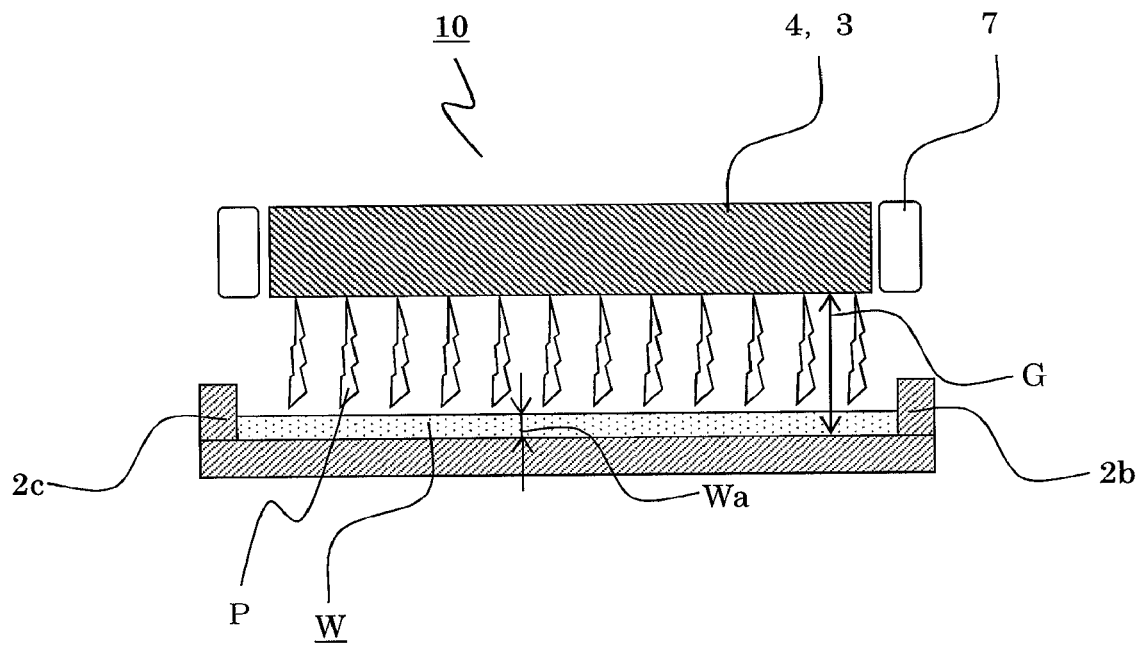
FIG. 2A is a cross-sectional view taken along a line A-A in FIG. 1.
Figure 2B:
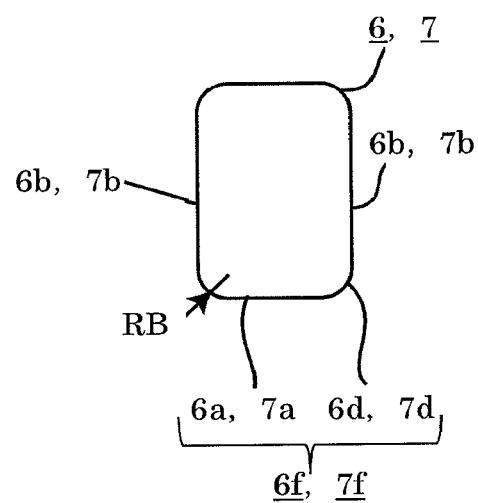
FIG. 2B is a cross-sectional view of a first member and a second member.
Figure 3A:
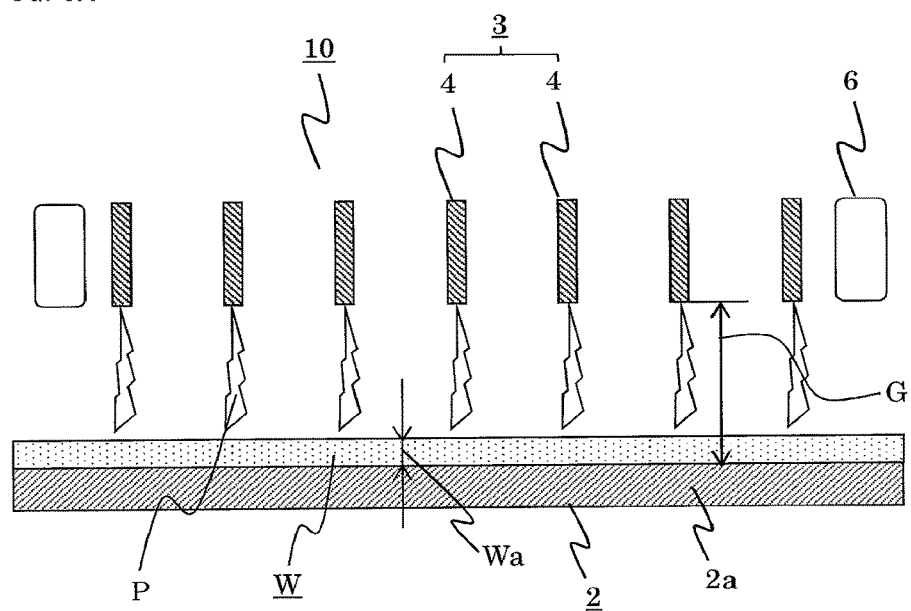
FIG. 3A is a cross-sectional view taken along a line B-B in FIG. 1.
Figure 3B:
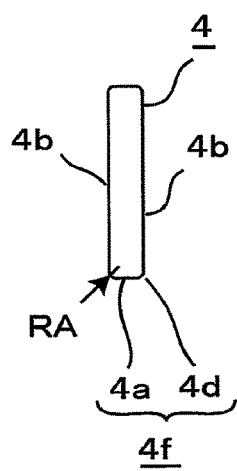
FIG. 3B is a cross-sectional view of a high-voltage electrode.

FIGS. 1 to 3 illustrate Embodiment 1 for carrying out the present invention. FIG. 1 is a configuration diagram showing the configuration of a water treatment apparatus, FIG. 2A is a cross-sectional view taken along a line A-A in FIG. 1, FIG. 2B is a cross-sectional view of a first member and a second member, FIG. 3A is a cross-sectional view taken along a line B-B in FIG. 1, and FIG. 3B is a cross-sectional view of a high-voltage electrode. In these diagrams, the water treatment apparatus 10 has a flow path portion 2, a high-voltage portion 3, and an electric field relaxation portion 5, and is supplied with power from a pulse power supply 8 disposed at the left side of the flow path portion 2 in FIG. 1. Although not shown, the flow path portion 2, the high-voltage portion 3, and the electric field relaxation portion 5 are housed in a closed or semi-closed housing device. In the water treatment apparatus 10, treatment target water W is treated by electric discharge while flowing on the flow path portion 2 (the details thereof will be described in later). The flow path portion 2 on which the treatment target water W flows has a bottom plate (flow path) 2a and a pair of side walls 2b and 2c. The bottom plate 2a has a flat plate shape and extends in the direction (the direction of the line B-B in FIG. 1) in which the treatment target water W flows, and the pair of side walls 2b and 2c are provided on both end portions of the bottom plate 2a in a direction (the direction of the line A-A in FIG. 1) orthogonal to the extension direction of the bottom plate 2a, so that the flow path portion 2 has a trough shape having a flat bottom surface and a rectangular cross-sectional shape. The flow path portion 2 is formed by a conductive material. In particular, it is desirable that a metal material having excellent corrosion resistance such as stainless steel and titanium is used as the material of the flow path portion 2. The treatment target water W flows through a groove-like portion that has a rectangular cross-sectional shape and that is formed by the bottom plate 2a, the side wall 2b, and the side wall 2c of the flow path portion 2.

The high-voltage portion 3 serving as a voltage application portion is disposed above the flow path portion 2. The high-voltage portion 3 has a plurality of high-voltage electrodes 4 that are arranged at regular intervals in the extension direction of the flow path portion 2 (the direction of the line B-B in FIG. 1). Each high-voltage electrode 4 has a ribbon shape as shown in FIG. 3B, that is, a thin plate shape having a rectangular cross-section, and has a flat surface portion 4a, side surface portions 4b, and corner portions 4d. By forming the high-voltage electrode 4 in a thin plate shape as described above, desired mechanical strength of the high-voltage electrode 4 can be ensured. The flat surface portion 4a opposing the flow path portion 2 is lengthened in an extension direction in which the high-voltage electrode 4 extends and that is a predetermined direction. The flat surface portion 4a has the corner portions 4d at both sides thereof in the direction orthogonal to the extension direction of the high-voltage electrode 4. Each corner portion 4d is formed into an arc cross-sectional shape with a radius of curvature RA by rounding processing. The flat surface portion 4a and the corner portions 4d at both sides thereof form an opposing portion 4f opposing the flow path portion 2 in the present invention.

The high-voltage electrode 4 is formed by a conductive material. In particular, it is desirable that a metal material having excellent corrosion resistance such as stainless steel and titanium is used as the material of the high-voltage electrode 4. The high-voltage electrode 4 is held parallel to the upper surface of the bottom plate 2a of the flow path portion 2 and above the flow path portion 2 by an insulation holding member (not shown), such that the extension direction of the high-voltage electrode 4 coincides with the direction (the direction of the line A-A in FIG. 1) orthogonal to the extension direction of the flow path portion 2 (the direction in which the treatment target water W flows), with a predetermined gap G (see FIGS. 2 and 3) provided between the high-voltage electrode 4 and the flow path portion 2 such that a gas layer is formed between the high-voltage electrode 4 and the flow path portion 2. That is, the high-voltage electrode 4 is held such that the gap G between the opposing portion 4f of the high-voltage electrode 4 and the upper surface of the bottom plate 2a has a constant value and the gas layer is formed between the high-voltage electrode 4 and the flow path portion 2. The high-voltage electrode 4 is electrically insulated from the flow path portion 2 by the insulation holding member.

The electric field relaxation portion 5 is formed into a rectangular frame shape by a pair of first members 6 serving as electric field relaxation members and a pair of second members 7 serving as electric field relaxation members. The first members 6 and the second members 7 are electrically connected to each other. The electric field relaxation portion 5, which is formed into a rectangular shape, is disposed so as to surround the periphery of the high-voltage portion 3 from four directions. That is, as shown in FIG. 3A, the first members 6 of the electric field relaxation portion 5 are disposed so as to oppose the respective high-voltage electrodes 4 located at both end portions, in the extension direction of the flow path portion 2 of the high-voltage portion 3, with a predetermined gap provided in the right-left direction in FIG. 3A. In addition, as shown in FIG. 2A, the second members 7 are disposed so as to oppose end portions in the right-left direction in FIG. 1, of the high-voltage electrodes 4, that is, the high-voltage portion 3, that is, with a gap provided between both end portions in the extension direction of the plurality of high-voltage electrodes 4 and the second members 7. The first members 6 and the second members 7 are formed by conductive material. In particular, it is desirable that a metal material having excellent corrosion resistance such as stainless steel and titanium is used as the materials of the first members 6 and the second members 7. In the present embodiment, solid rectangular parallelepipeds (stainless steel square materials) having the same cross-sectional dimension and a rectangular cross-section are used as the first members 6 and the second members 7. As shown in FIG. 2B, each first member 6 has a flat surface portion 6a, side surface portions 6b, and corner portions 6d. The flat surface portion 6a is lengthened in the length direction of the first member 6 (the direction perpendicular to the sheet of the drawing) that is a predetermined direction, and the corner portions 6d having an arc cross-sectional shape are provided as round portions at the side edges of the flat surface portion 6a. Each corner portion 6d has a radius of curvature RB larger than the radius of curvature RA of corner portions 4d of the high-voltage electrodes 4. The flat surface portion 6a of the first member 6 and the corner portions 6d at both sides thereof form an opposing portion 6f opposing the flow path portion 2 in the present invention.

Similarly, as shown in FIG. 2B, each second member 7 has a flat surface portion 7a, side surface portions 7b, and corner portions 7d. The flat surface portion 7a is lengthened in the length direction of the second member 7 that is a predetermined direction, and the corner portions 7d having an arc cross-sectional shape are provided as round portions at the side edges of the flat surface portion 7a. Each corner portion 7d has a radius of curvature RB larger than the radius of curvature RA of the corner portions 4d of the high-voltage electrodes 4. The flat surface portion 7a of the second member 7 and the corner portions 7d at both sides thereof form an opposing portion 7f opposing the flow path portion 2 in the present invention. Regarding rounding processing of the corner portions 4d and the corner portions 6d and 7d, if commercially available materials can be used as they are, the materials are used without being processed. Further if necessary, commercially available materials are machined into a predetermined dimension. With reference to FIGS. 2A, 2B, 3A and 3B, the electric field relaxation portion 5 is held above the flow path portion 2 by an insulation holding member, which is not shown, so that a predetermined gap G is provided between the electric field relaxation portion 5 and the flow path portion 2 so as to form a gas layer between the electric field relaxation portion 5 and the flow path portion 2. The electric field relaxation portion 5 is electrically insulated from the flow path portion 2 by the insulation holding member.

The pulse power supply 8 is provided on the lateral side of the flow path portion 2. The pulse power supply 8 has one terminal connected to the high-voltage portion 3 and the electric field relaxation portion 5 by connection wires 9, and has another terminal that is connected to the flow path portion 2 and also grounded together with the flow path portion 2. Electric discharge is generated between the flow path portion 2 and the high-voltage portion 3 by applying a high voltage from the pulse power supply 8 between the flow path portion 2 and the high-voltage portion 3 (the high-voltage electrodes 4).

Next, operation of the water treatment apparatus 10 will be described. The treatment target water W is supplied from the outside to the flow path portion 2. At this time, the treatment target water W flows on the bottom plate 2a of the flow path portion 2 and between the side walls 2b and 2c. Here, the gas layer is formed between: the flow path portion 2; and the high-voltage portion 3, the first members 6, and the second members 7. That is, the thickness Wa of the treatment target water is adjusted such that the gas layer is formed between: the treatment target water W; and the high-voltage portion 3, the first members 6, and the second members 7. That is, the thickness Wa of the treatment target water is smaller than the gap G between the flow path portion 2 and the high-voltage portion 3 (the first members 6 and the second members 7). At this time, the pulse power supply 8 is operated to apply a pulsed high voltage to the high-voltage portion 3 and the electric field relaxation portion 5 (the first members 6 and the second members 7), whereby electric discharge P is generated between the high-voltage electrodes 4 and the flow path portion 2. The treatment target water W passes below the electric discharge P formed by the high-voltage electrodes 4, while flowing through the flow path portion 2. At this time, active species formed by the electric discharge P are dissolved into the treatment target water W. As a result, water treatment such as removal of persistent substances is performed on the treatment target water W. The electric discharge is mainly glow discharge or streamer discharge.

Next, the principle by which the water treatment apparatus 10 according to Embodiment 1 performs the treatment of the treatment target water W will be described. Here, a description will be given with decomposition of organic matters as an example. It is well known that $O_3$ or OH radicals generated by electric discharge are also effective for disinfection, decolorization, and deodorization.

Air, oxygen, rare gases (argon, neon), and the like are used as gas that is supplied between the high-voltage portion 3 and the flow path portion 2 and that forms the gas layer. By applying the pulsed voltage to the high-voltage portion 3, electric discharge occurs in the gas layer formed between the high-voltage portion 3 and the flow path portion 2, or at the interface between the gas layer and the treatment target water W. At this time, oxygen molecules ($O_2$) and water molecules ($H_2O$) collide against high-energy electrons and dissociation reactions in formula (1) and formula (2) take place. Here, "e" represents electron, O represents atomic oxygen, H represents atomic hydrogen, and OH represents OH radical.

$$e + O_2 \rightarrow 2O \tag{1}$$

$$e + H_2O \rightarrow H + OH \tag{2}$$

A part of atomic oxygen generated in formula (1) becomes ozone ($O_3$) by formula (3). Here, M represents a third body in the reaction, and represents every molecule or atom in the gas.

$$O + O_2 + M \rightarrow O_3 \tag{3}$$

In addition, a part of OH radical generated in formula (2) becomes hydrogen peroxide ($H_2O_2$) by a reaction in formula (4).

$$OH + OH \rightarrow H_2O_2 \tag{4}$$

Then, oxidizing active species such as O, OH, $O_3$, and $H_2O_2$ generated by the reactions in formulas (1) to (4) oxidatively decompose organic matters in the treatment target water W into carbon dioxide ($CO_2$) and water by a reaction in formula (5). Here, R represents organic matters to be treated.

$$R + (O, OH, O_3, H_2O_2) \rightarrow CO_2 + H_2O \tag{5}$$

Meanwhile, a part of $O_3$ and $H_2O_2$ generated in formula (3) and formula (4) is dissolved into the treatment target water W from the surface of the treatment target water W by formula (6) and formula (7). Here, (l) means a liquid phase.

$$O_3 \rightarrow O_3 \text{ (l)} \tag{6}$$

$$H_2O_2 \rightarrow H_2O_2 \text{ (l)} \tag{7}$$

Furthermore, by reaction between $O_3$ (l) and $H_2O_2$ (l), OH radical is generated in the water as shown in formula (8).

$$O_3 \text{ (l)} + H_2O_2 \text{ (l)} \rightarrow OH \text{ (l)} \tag{8}$$

$O_3$ (l), $H_2O_2$ (l), and OH (l) generated in formulas (6) to (8) decompose the organic matters by the reaction in the water as shown in formula (9).

$$R + (O_3 \text{ (l)}, OH \text{ (l)}, H_2O_2 \text{ (l)}) \rightarrow CO_2 + H_2O \tag{9}$$

As described above, the decomposition of the organic matters in the treatment target water W according to Embodiment 1 proceeds as both decomposition of the organic matters on the surface of the treatment target water W by the reaction (5) and decomposition of the organic matters in the treatment target water W by the reaction (9).

Next, the principle by which the water treatment apparatus 10 described in Embodiment 1 forms uniform electric discharge P between the high-voltage portion 3 and the flow path portion 2, will be described. When a high voltage is applied from the pulse power supply 8 to the high-voltage portion 3 and the electric field relaxation portion 5, an electric field is formed between the flow path portion 2; and the high-voltage electrodes 4 and the electric field relaxation portion 5. At this time, the high-voltage portion 3 and the electric field relaxation portion 5 have the same potential, and thus the gradient of the potential in the space across which the high-voltage portion 3 and the electric field relaxation portion 5 oppose each other becomes small. That is, as shown in FIG. 2A, the gradient of the potential in each of the spaces between the second members 7 and both end portions, in the extension direction, of each high-voltage electrode 4 becomes small. In addition, as shown in FIG. 3A, the gradient of the potential in each of the spaces between the first members 6 and the respective high-voltage electrodes 4 located at both end portions, in the extension direction, of the flow path portion 2 becomes small. An electric field is defined by the gradient of a potential, and thus the electric field in the space across which the high-voltage portion 3 and the electric field relaxation portion 5 oppose each other becomes small. The electric field at each end portion of the high-voltage portion 3 is relaxed by the potential of the electric field relaxation portion 5, and thus a uniform and strong electric field is formed at the flat surface portion 4a, opposing the flow path portion 2, of each high-voltage electrode 4. As a result, uniform electric discharge P is formed between each high-voltage electrode 4 and the flow path portion 2. Meanwhile, in the electric field relaxation portion 5, the radius of curvature RB of each of the corner portions 6d and 7d, opposing the flow path portion 2, of the first members 6 and the second members 7 is larger than the radius of curvature RA of each corner portion 4d, opposing the flow path portion 2, of each high-voltage electrode 4. Thus the electric field at the opposing portion 6f (the flat surface portion 6a and the corner portions 6d at both sides thereof), opposing the flow path portion 2, of each first member 6, and the electric field at the opposing portion 7f (the flat surface portion 7a and the corner portions 7d at both sides thereof), opposing the flow path portion 2, of each second member 7 become smaller than the electric field at the opposing portion 4f (the flat surface portion 4a and the corner portions 4d at both sides thereof), opposing the flow path portion 2, of each high-voltage electrode 4.

That is, the maximum electric field intensities of the opposing portions 6f and 7f, opposing the flow path portion 2, of the first members 6 and the second members 7 are smaller than the maximum electric field intensity of a center portion of each flat surface portion 4a, opposing the flow path portion 2, of the high-voltage portion 3. Thus electric discharge P does not occur between the flow path portion 2, and the first members 6 and the second members 7. Therefore, by relaxing the electric field at each end portion of the high-voltage portion 3 by the first members 6 and the second members 7, uniform electric discharge P can be formed between the high-voltage portion 3 and the flow path portion 2 without being concentrated at each end portion of the high-voltage portion 3. Thus the amount of the active species to be generated by electric discharge can be increased, and the amount of the active species to be supplied into the treatment target water can be increased.

As described above, in Embodiment 1, the electric field at each end portion of the high-voltage portion 3 is relaxed by the electric field relaxation portion 5, and thus uniform electric discharge P is formed between the high-voltage portion 3 and the flow path portion 2. As a result, the electric discharge P and the treatment target water W contact each other in a wide area, so that the treatment target water W can be treated at high speed. Furthermore, even in the case where the flow path portion 2 is formed by conductive material, the high-voltage portion 3 can be provided near the side walls 2*b* and 2*c*. Thus the electric discharge P can be formed on a wider area of the surface of the treatment target water W, so that the treatment target water W can be treated at high speed. Moreover, since the conductive material can be used for the flow path portion 2, the effect of reducing the production cost of the flow path portion 2 can also be obtained.

In Embodiment 1, the pulse power supply 8 is used in order to form electric discharge. However, the power supply used in the present invention does not necessarily need to be a pulse power supply as long as electric discharge can be stably formed, and the power supply may be, for example, an AC power supply or a DC power supply.

The polarity of the voltage to be outputted from the pulse power supply 8, a voltage wave height, a repetition frequency, a pulse width, and the like can be appropriately determined in accordance with various conditions such as the structures of the high-voltage electrodes 4 and the flow path portion 2 and the gas type of the gas layer. Generally, it is desirable that the voltage wave height is 1 kV to 50 kV. This is because: when the voltage wave height is less than 1 kV, stable electric discharge is not formed; and in order to make the voltage wave height greater than 50 kV, the size of the power supply is increased and electric insulation becomes difficult, and thus the production cost and the maintenance cost significantly increase.

It is desirable that the repetition frequency is not less than 10 pps (pulse-per-second) and not more than 100 kpps. This is because: when the repetition frequency is less than 10 pps, a very high voltage is needed in order to apply sufficient electric discharge power; and when the repetition frequency is greater than 100 kpps, the effect of water treatment becomes saturated, so that the power efficiency decreases. The voltage wave height, the repetition frequency, and the pulse width may be adjusted in accordance with the flow rate of the treatment target water W, or components contained in the treatment target water W or the concentrations thereof.

The flow path portion 2 is formed by conductive material and connected to the ground-side terminal of the pulse power supply 8. That is, the flow path portion 2 serves as a ground electrode for generating electric discharge P. By making the flow path portion 2 serve as a ground electrode, a wide ground electrode area can be ensured with respect to the high-voltage portion 3 and the treatment target water W. Thus, a distribution of voltage drop in the treatment target water W during high voltage application can be improved, and an electric field formed between the high-voltage portion 3 and the flow path portion 2 can be made uniform.

As for each high-voltage electrode 4, the ribbon-shaped high-voltage electrode 4 is used in the present embodiment, but the shape thereof does not necessarily need to be the ribbon shape. For example, a wire, a plate having a large number of needles or screws fixed thereto in a comb tooth manner, a plate having a mesh shape, a punching metal, or the like can be appropriately used as each high-voltage electrode 4. The ribbon shape can ensure mechanical strength and can improve the durability of the high-voltage electrode 4, as compared to the other shapes. Thus, the ribbon shape is preferable. In addition, it is preferable that the magnitude of the radius of curvature RA of each corner portion 4*d*, opposing the flow path portion 2, of the high-voltage electrode 4 and the width of the flat surface portion 4*a* of the high-voltage electrode 4 are reduced in a range in which machine processing is possible, in order to form a strong electric field with a low voltage at the opposing portion 4*f*, opposing the flow path portion 2, of the high-voltage electrode 4. In general, it is preferable that the magnitude of the radius of curvature RA of each corner portion 4*d* and the width of the flat surface portion 4*a* are not greater than 1 mm. When the magnitude of the radius of curvature RA and the width of the flat surface portion 4*a* are greater than 1 mm, a high voltage is needed in order to form electric discharge according to this.

In the water treatment apparatus 10 according to the present embodiment, the number of high-voltage electrodes 4 or the gap between the high-voltage electrodes 4 can be appropriately changed in accordance with the flow rate of the treatment target water W or the components contained in the treatment target water W or the concentrations thereof. In addition, the gap G between each high-voltage electrode 4 and the flow path portion 2 can be arbitrarily determined. However, it is preferable that the gap G is not less than 1 mm and not more than 50 mm. This is because: when the gap G is less than 1 mm, it is difficult to define an accurate height; and when the gap G is more than 50 mm, a very high voltage is needed in order to form electric discharge.

In the present embodiment, solid stainless steel square materials having a rectangular cross-section are used as the first members 6 and the second members 7, but the radius of curvature RB of each of the corner portions 6*d* and 7*d* at both sides of the flat surface portions 6*a* and 7*a* opposing the flow path portion 2 only need to be larger than the radius of curvature RA of each of the corner portions 4*d* at both sides of the flat surface portion 4*a*, opposing the flow path portion 2, of each high-voltage electrode 4. And the first members 6 and the second members 7 do not necessarily need to have a rectangular cross-sectional shape. For example, a rectangular parallelepiped, a rod having a circular or elliptical cross-section, balls or ellipsoids connected to each other, a plate having a cross-section of a paraboloid shape having a projection at the side opposing the flow path portion 2, a shape obtained by a combination thereof, or the like can be appropriately used as the first members 6 and the second members 7. In addition, the first members 6 and the second members 7 may be hollow or the surfaces thereof may be entirely or partially formed with a mesh structure. In the case where the first members 6 and the second members 7 are hollow or the surfaces thereof are formed by a mesh structure, the weights of the first members 6 and the second members 7 can be reduced. Thus the production cost of the insulation holding member, for the first members 6 and the second members 7, which is not shown, can be reduced.

Figure 4:
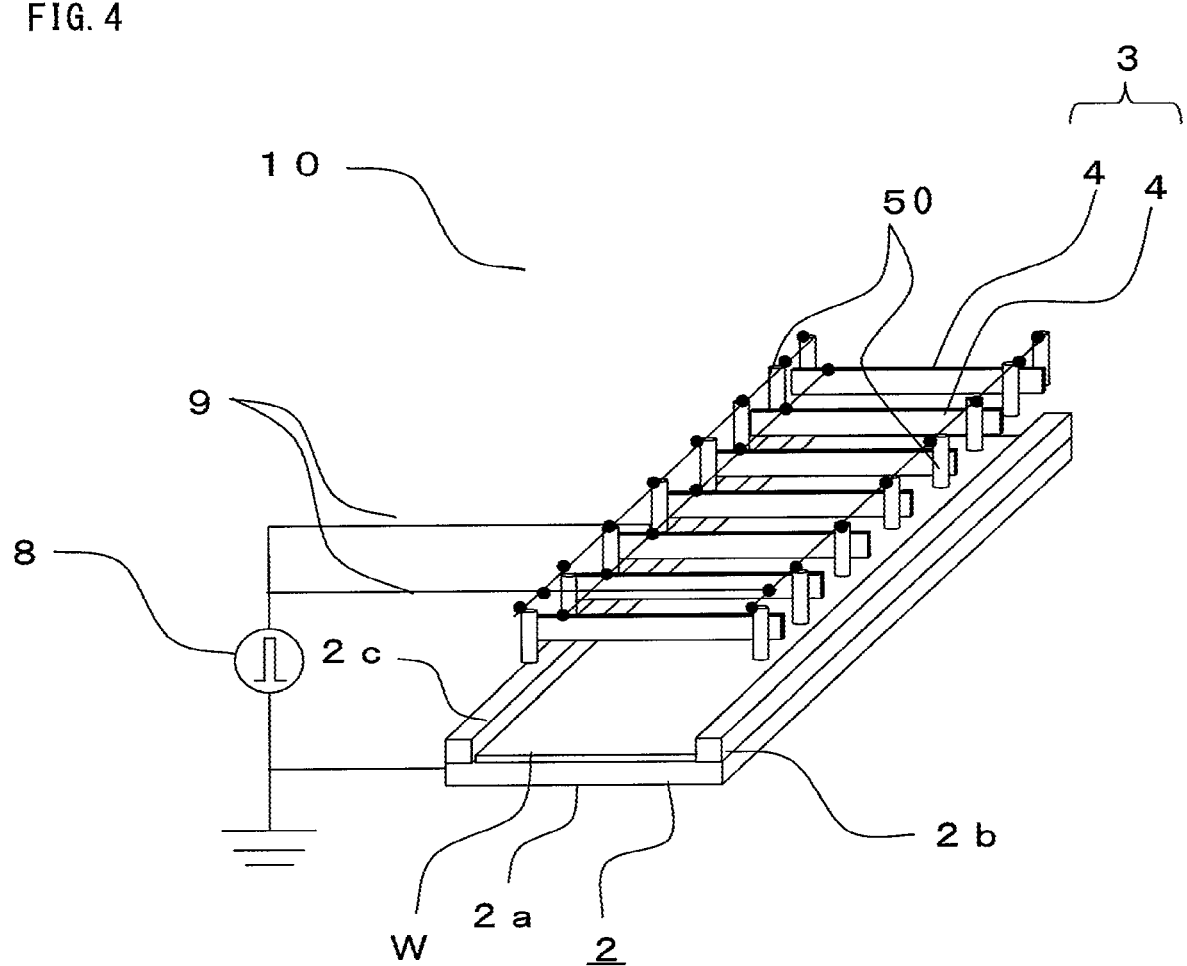
FIG. 4 is a configuration diagram showing the configuration of a modification example according to Embodiment 1 of the present invention.

In the present embodiment, a single rectangular parallelepiped member is used as each of the pair of first members 6 and the pair of second members 7. But the radius of curvature RB of each of the corner portions 6*d* and 7*d* at the side edges of the flat surface portions 6*a* and 7*a* opposing the flow path portion 2 only needs to be larger than the radius of curvature RA of each of the corner portions 4*d* at the side edges of the flat surface portion 4*a*, opposing the flow path portion 2, of each high-voltage electrode 4. And each of the first members 6 and the second members 7 does not necessarily need to be composed of a single member. Regarding the shapes of the first members 6 and the second members 7, for example, the first members 6 and the second members 7 can have a structure including a plurality of members such as rectangular parallelepipeds, balls, or cylindrical columns disposed so as to be spaced apart from each other as shown in FIG. 4. By using the first members 6 and the second members 7 which are composed of a plurality of members, the weights of the first members 6 and the second members 7 can be reduced. Thus the production cost of the insulation holding member, for the first members 6 and the second members 7, which is not shown, can be reduced. Moreover, the gap between each partial member 50 and the flow path portion 2 can be adjusted in accordance with production variations of the high-voltage electrodes 4. Thus the production cost of the high-voltage electrodes 4 and the water treatment apparatus 10 can be reduced.

In the present embodiment, the same rectangular parallelepiped members are used as the pair of first members 6 and the pair of second members 7, but members having different shapes can be used as the first members 6 and the second members 7. For example, the second members 7 can be disposed adjacent to the side walls 2b and 2c of the flow path portion 2. Meanwhile, the first members 6 are disposed so as to oppose the flow path 2a. Therefore, the distance between the flow path portion 2 and each first member 6 is larger than the distance between the flow path portion 2 and each second member 7. That is, the electric field between each first member 6 and the flow path portion 2 is smaller than the electric field between each second member 7 and the flow path portion 2. Therefore, a radius of curvature required for the corner portions 6d of the first members 6 is smaller than that for the corner portions 7d of the second members 7. Since the radius of curvature required for the first members 6 is different from that for the second members as described above, each of the shapes of the first members and the second members can be changed in accordance with the required radius of curvature. By making the radius of curvature of each first member 6 smaller than the radius of curvature of each second member, the first member 6 can be thinned. By thinning each first member 6, the production cost of the insulation holding member, for the first members 6 and the second members 7, which is not shown, can be reduced.

The gaps between each high-voltage electrode 4, and each first member 6 and each second member 7 can be appropriately determined in accordance with various conditions such as the structures of the high-voltage electrodes 4 and the first members 6 (and the second members 7) and the gas type of the gas layer. Generally, when the gaps between each high-voltage electrode 4, and each first member 6 and each second member 7 are smaller than the gap between the adjacent high-voltage electrodes 4, the first members 6 and the second members 7 function more effectively.

In the present embodiment, the pair of first members 6 are provided in the direction orthogonal to the flow of the treatment target water W and the pair of second members 7 are provided in the direction along the flow of the treatment target water W such that the first members 6 and the second members 7 extend around the outer periphery of the high-voltage portion 3. But only either the first members 6 or the second members 7 may be provided. That is, each first member 6 or each second member 7 may be disposed at some of the end portions of the high-voltage portion 3. For example, in the case of the present embodiment, when the gap between the adjacent high-voltage electrodes 4 is larger than the gap G between the high-voltage portion 3 and the flow path portion 2, the pair of first members 6, which are disposed in the direction along the flow of the treatment target water W, can be omitted.

In the present embodiment, the high-voltage portion 3, the first members 6, and the second members 7 are connected in parallel to the pulse power supply 8 via the connection wires 9. But the high-voltage portion 3 and the electric field relaxation portion 5 can be connected in series to the pulse power supply 8. The first members 6 and the second members 7 are assembled in a state in which the first members 6 and the second members 7 are electrically in contact with each other.

In the present embodiment, the high-voltage portion 3, the first members 6, and the second members 7 are individually produced. But the high-voltage portion 3, the first members 6, and the second members 7 can be produced so as to be integrated with each other. For example, by integrally molding the high-voltage portion 3, the first members 6, and the second members 7, the gap between the adjacent high-voltage electrodes 4 and the gaps between the high-voltage portion 3, and the first members 6 and the second members 7 can be adjusted with high accuracy. That is, the electric field at the flat surface portion 4a, opposing the flow path portion 2, of each high-voltage electrode 4 can be adjusted with high accuracy. Thus uniform electric discharge can be easily obtained. In addition, by integrally molding the high-voltage portion 3, the first members 6, and the second members 7, the number of components can be reduced. And the durability of the water treatment apparatus 10 can be improved. Further the production cost can be reduced.

In the water treatment apparatus 10 described in the present embodiment, the pulse power supply 8 is provided on the lateral side of the flow path portion 2. But the pulse power supply 8 can be provided at a position distant from the flow path portion 2 by extending the connection wires 9. In addition, by housing the flow path portion 2, the high-voltage portion 3, and the electric field relaxation portion 5 in the closed or semi-closed housing device and providing the pulse power supply 8 outside the housing device, the pulse power supply 8 can be prevented from being deteriorated by sprays or steam of the treatment target water W or oxidizing particles generated by electric discharge.

Embodiment 2

Figure 5:
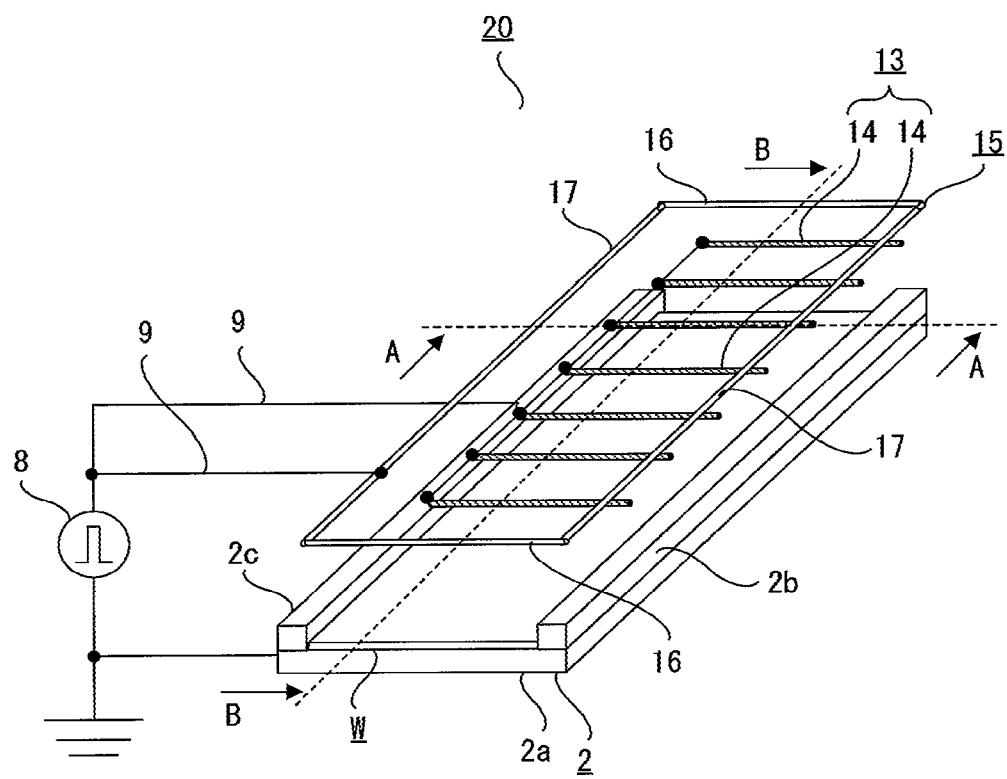
FIG. 5 is a configuration diagram showing the configuration of a water treatment apparatus according to Embodiment 2 of the present invention.
Figure 6A:
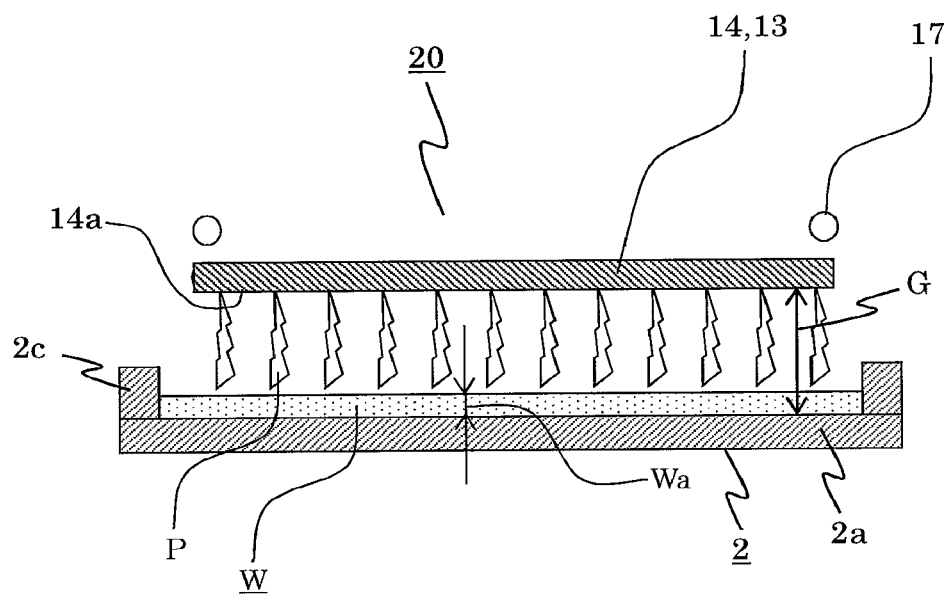
FIG. 6A is a cross-sectional view taken along a line A-A in FIG. 5.
Figure 6B:
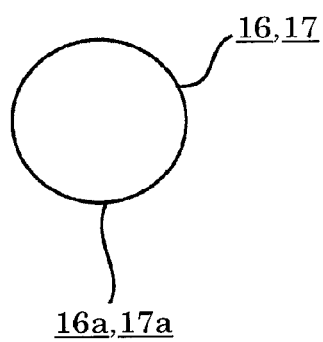
FIG. 6B is a cross-sectional view of a first member and a second member.
Figure 7:
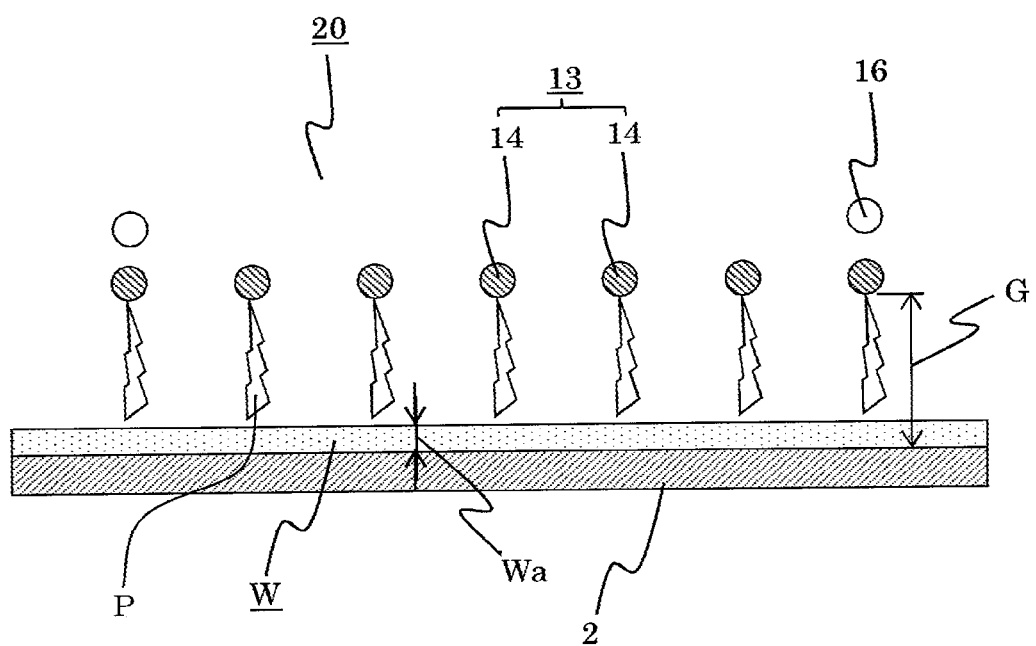
FIG. 7 is a cross-sectional view taken along a line B-B in FIG. 5.

FIGS. 5 to 7 illustrate Embodiment 2. FIG. 5 is a configuration diagram showing the configuration of a water treatment apparatus, FIG. 6A is a cross-sectional view taken along a line A-A in FIG. 5, FIG. 6B is a cross-sectional view of a first member and a second member, and FIG. 7 is a cross-sectional view taken along a line B-B in FIG. 5. In these diagrams, the water treatment apparatus 20 has a high-voltage portion 13 serving as a voltage application portion. The high-voltage portion 13 has a plurality of high-voltage electrodes 14. The high-voltage electrodes 14 are formed by a stainless steel wires having a circular cross-sectional shape (the same as later-described first members 16 and second members 17 in FIG. 6B). And the plurality of the high-voltage electrodes 14 are arranged above the flow path portion 2 at regular intervals in the extension direction of the flow path portion 2 such that the length direction of the high-voltage electrodes 14 coincides with a direction (the direction of the line A-A in FIG. 5) orthogonal to the extension direction of the flow path portion 2. An opposing portion 14a, opposing the flow path portion 2, of each high-voltage electrode 14 is a lower half of the wire having a circular cross-sectional shape. Each high-voltage electrode 14 is held parallel to the flow path portion 2 and above the flow path portion 2 by an insulation holding member, which is not shown. And each high-voltage electrode 14 is held with a gap G provided such that a gas layer is formed between the high-voltage electrode 14 and the flow path portion 2. That is, the high-voltage electrode 14 is held such that the gap G between the high-voltage electrode 14 and the flow path portion 2 has a constant value and a gas layer is formed between the high-voltage electrode 14 and the flow path portion 2.

An electric field relaxation portion 15 is formed into a rectangular shape by combining a pair of first members 16 serving as electric field relaxation members and a pair of second members 17 serving as electric field relaxation members in which a wire that has a circular cross-sectional shape (see FIG. 6B) and that is the same as the high-voltage electrodes 14 is used. The first members 16 and the second members 17 are electrically connected to each other. The electric field relaxation portion 15 is disposed above the high-voltage portion 13. Specifically, as shown in FIG. 7, the first members 16 of the electric field relaxation portion 15 are disposed above the high-voltage electrodes 14, that is, the high-voltage portion 13, so as to oppose the high-voltage electrodes 14 located at both end portions, in the extension direction of the flow path portion 2, of the high-voltage portion 13, with a predetermined gap provided in the up-down direction in FIG. 7. In addition, as shown in FIG. 6A, the second members 17 are disposed above the high-voltage electrodes 14, that is, the high-voltage portion 13, so as to oppose both end portions, in the direction orthogonal to the extension direction of the flow path portion 2, of the plurality of disposed high-voltage electrodes 14, with a predetermined gap provided therebetween. The electric field relaxation portion 15 is maintained at the same potential as the high-voltage portion 13. An opposing portion 16a and an opposing portion 17a, opposing the flow path portion 2, of each first member 16 and each second member 17 are lower halves of the wires having a circular cross-sectional shape. Since the electric field relaxation portion 15 is provided above the high-voltage portion 13 in FIG. 6A, the gap between the electric field relaxation portion 15 and the flow path portion 2 is larger than the gap G between the high-voltage portion 13 and the flow path portion 2. That is, the electric field relaxation portion 15 is disposed at a position farther from the flow path portion 2 than the high-voltage portion 13. In addition, the electric field relaxation portion 15 is disposed such that the gap between the electric field relaxation portion 15 and each high-voltage electrode 14 is smaller than the gap between the adjacent high-voltage electrodes 14. The first members 16 and the second members 17 are held by an insulation holding member that is not shown. The other configuration is the same as the configuration of Embodiment 1 shown in FIG. 1. Thus, the corresponding components are designated by the same reference characters, and the description thereof is omitted.

Next, the principle by which the water treatment apparatus 20 described in the present embodiment forms uniform electric discharge P between the high-voltage portion 13 and the flow path portion 2, will be described. When a high voltage is applied from the pulse power supply 8 to the high-voltage portion 13, the first members 16, and the second members 17, an electric field is formed between the flow path portion 2; and the high-voltage electrodes 14, the first members 16, and the second members 17. At this time, the electric field at each end portion of the high-voltage portion 13 is relaxed by the potentials of the first members 16 and the second members 17. Thus a uniform and strong electric field is formed at the opposing portion 14a, opposing the flow path portion 2, of each high-voltage electrode 14. As a result, uniform electric discharge P occurs between each high-voltage electrode 14 and the flow path portion 2. Meanwhile, in the first members 16 and the second members 17, the gaps between the flow path portion 2, and the first members 16 and the second members 17 are larger than the gap between each high-voltage electrode 14 and the flow path portion 2, and the electric fields at the opposing portions 16a,17a of the first members 16 and the second members 17 are smaller than the electric field formed at the opposing portion 14a of each high-voltage electrode 14. Thus, electric discharge P does not occur between the flow path portion 2, and the first members 16 and the second members 17. Therefore, by relaxing the electric field at each of the end portions of the high-voltage electrodes 14 by the first members 16 and the second members 17, electric discharge P dose not concentrate at each end portion of the high-voltage portion 13, and uniform electric discharge P is generated between the high-voltage portion 13 and the flow path portion 2. Thus the amount of the active species to be generated can be increased, and the amount of the active species to be supplied into the treatment target water can be increased.

In the above, the electric field relaxation portion 15 is provided above the high-voltage portion 13 at a position farther from the flow path portion 2 than the high-voltage portion 3. By disposing the high-voltage portion 13 and the electric field relaxation portion 15 such that the high-voltage portion 13 and the electric field relaxation portion 15 partially overlap each other as seen from the flow path portion 2 side as described above, the spread (size) of the high-voltage portion 13 can be increased and the area of a portion of the high-voltage portion 13 that opposes the flow path portion 2 can be increased. Thus, electric discharge can be uniformly formed on a wide area of the surface of the treatment target water W. The high-voltage portion 13 and the electric field relaxation portion 15 may not overlap each other as seen from the flow path portion 2 side, and the electric field relaxation portion 15 may be located at a position higher than the high-voltage portion 13, that is, at a position farther from the flow path portion 2 than the high-voltage portion 13. In this case, the gap between the electric field relaxation portion 15 and each high-voltage electrode 14 is smaller than the gap between the adjacent high-voltage electrodes 14 and smaller than the gap between each high-voltage electrode 14 and the flow path portion 2. In addition, the electric field relaxation portion 15 may be larger than the outside dimension of the high-voltage portion 13 such that the electric field relaxation portion 15 and the high-voltage portion 13 do not overlap each other, and the electric field relaxation portion 15 may be located at a position higher than the high-voltage portion 13, that is, at a position farther from the flow path portion 2 than the high-voltage portion 13.

In the present embodiment, the wires that have a circular cross-sectional shape and that have the same dimension as the dimension of the high-voltage electrodes 14 are used as the first members 16 and the second members 17. But the first members 16 and the second members 17 may not have the same shape as the shape of the high-voltage electrodes 14. For example, a hollow round pipe, a rectangular parallelepiped, a rod having a circular or elliptical cross-section, balls or ellipsoids connected to each other, a plate having a cross-section of a paraboloid shape having a projection at the flow path portion 2 side, needle-shaped electric discharge portions provided in a comb tooth manner, a shape obtained by a combination thereof, or the like can be used as the first members 16 and the second members 17.

Embodiment 3

Figure 8:
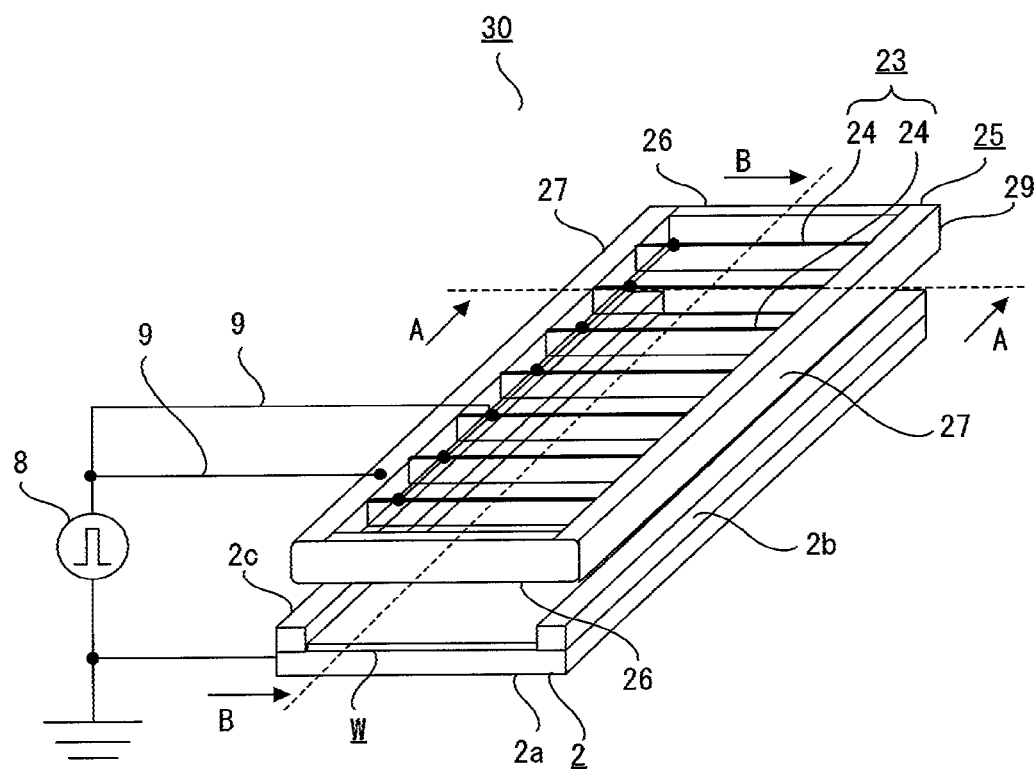
FIG. 8 is a configuration diagram showing the configuration of a water treatment apparatus according to Embodiment 3 of the present invention.
Figure 9A:
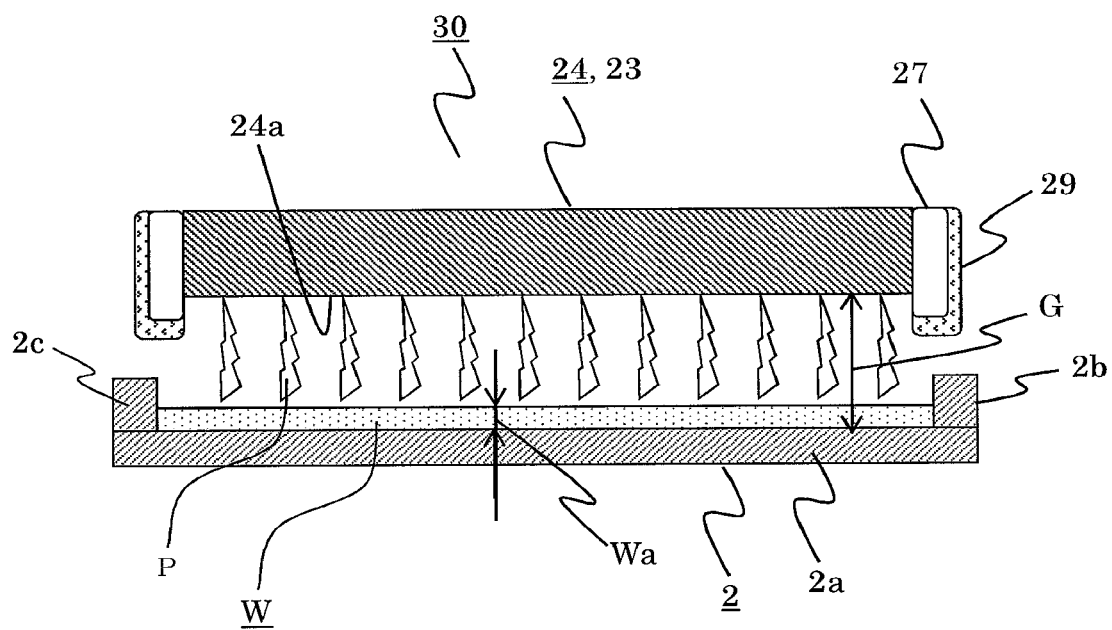
FIG. 9A is a cross-sectional view taken along a line A-A in FIG. 8.
Figure 9B:
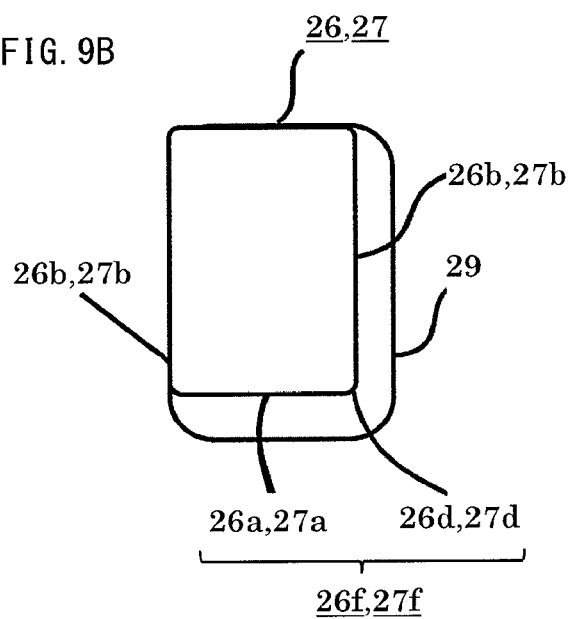
FIG. 9B is a cross-sectional view of a first member and a second member.
Figure 10A:
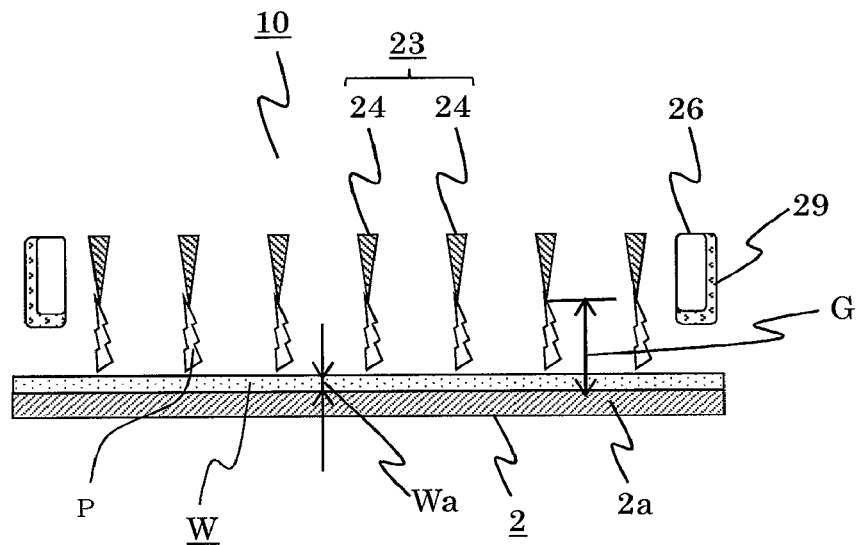
FIG. 10A is a cross-sectional view taken along a line B-B in FIG. 8.
Figure 10B:
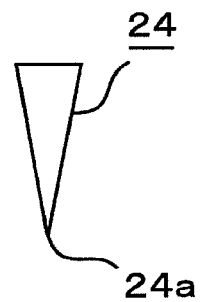
FIG. 10B is a cross-sectional view of a high-voltage electrode.

FIGS. 8 to 10 illustrate Embodiment 3. FIG. 8 is a configuration diagram showing the configuration of a water treatment apparatus, FIG. 9A is a cross-sectional view taken along a line A-A in FIG. 8, FIG. 9B is a cross-sectional view of a first member and a second member, FIG. 10A is a cross-sectional view taken along a line B-B in FIG. 8, and FIG. 10B is a cross-sectional view of a high-voltage electrode. In these diagrams, the water treatment apparatus 30 has a high-voltage portion 23 serving as a voltage application portion. The high-voltage portion 23 has a plurality of high-voltage electrodes 24. Each high-voltage electrode 24 has an opposing portion 24a having an edge-like cross-sectional shape as shown in FIG. 10B. The plurality of high-voltage electrodes 24 are arranged at regular intervals in the extension direction of a flow path portion 2 (the direction along the flow of treatment target water W) (the direction of the line B-B in FIG. 8). Each high-voltage electrode 24 is held parallel to the flow path portion 2 and above the flow path portion 2 by an insulation holding member, which is not shown, so as to extend in the direction (the direction of the line A-A in FIG. 8) orthogonal to the extension direction of the flow path portion 2. That is, the high-voltage electrode 24 is held such that the gap G between the high-voltage electrode 24 and the flow path portion 2 has a constant value and a gas layer is formed between the high-voltage electrode 24 and the flow path portion 2.

An electric field relaxation portion 25 maintained at the same potential as the high-voltage portion 23 is disposed around the high-voltage portion 23. The electric field relaxation portion 25 is formed into a rectangular shape by a pair of first members 26 serving as electric field relaxation members and a pair of second members 27 serving as electric field relaxation members. The first members 26 and the second members 27 are electrically connected to each other. Solid rectangular parallelepipeds (square materials made of stainless steel) (see FIG. 9B) having the same dimension and a rectangular cross-sectional shape are used as the first members 26 and the second members 27. An insulating layer 29 having an angled cross-sectional shape is provided so as to cover a flat surface portion 26a opposing the flow path portion 2 of each first member 26, corner portions 26d at both sides of the flat surface portion 26a, and a side surface portion 26b at the side opposite to the high-voltage portion 23. A rectangular parallelepiped that is the same as the first members 26 is used as each second member 27. And similarly, an insulating layer 29 having an angled cross-sectional shape is provided so as to cover a flat surface portion 27a opposing the flow path portion 2 of each second member 27, corner portions 27d at both sides of the flat surface portion 27a, and a side surface portion 27b at the side opposite to the high-voltage portion 23. In addition, the electric field relaxation portion 25 is disposed such that end portions of the opposing portions 24a of the high-voltage electrodes 24 and side surfaces of the second members 27 are in contact (close contact) with each other. Moreover, the gap between the insulating layer 29 and the flow path portion 2 is smaller than the gap between the high-voltage portion 23 and the flow path portion 2. The other configuration is the same as the configuration of Embodiment 1 shown in FIG. 1. Thus, the corresponding components are designated by the same reference characters, and the description thereof is omitted. The flat surface portion 26a and the corner portions 26d at both sides thereof form an opposing portion 26f opposing the flow path portion 2 in the present invention, and the flat surface portion 27a and the corner portions 27d at both sides thereof form an opposing portion 27f opposing the flow path portion 2 in the present invention.

Next, the principle by which the water treatment apparatus 30 described in the present embodiment forms uniform electric discharge P between the high-voltage portion 23 and the flow path portion 2, will be described. When a high voltage is applied from the pulse power supply 8 to the high-voltage portion 23 and the electric field relaxation portion 25, an electric field is formed between the flow path portion 2; and the high-voltage electrodes 24, the first members 26, and the second members 27. At this time, the electric field at each of the high-voltage electrodes 24 at the most upstream side and the most downstream side of the flow of the treatment target water W is relaxed by the potential of the adjacent first members 26, and thus a uniform and strong electric field is formed at the opposing portion 24a, opposing the flow path portion 2, of each high-voltage electrode 24. As a result, uniform electric discharge P occurs between each high-voltage electrode 24 and the flow path portion 2. Meanwhile, the insulating layer 29 is provided on the flat surface portion 26a, opposing the flow path portion 2, of each first member 26. Thus a voltage drop occurs within the insulating layer 29, and the electric field at the surface, opposing the flow path portion 2, of the insulating layer 29 becomes smaller than the electric field at the opposing portion 24a, opposing the flow path portion 2, of each high-voltage electrode 24. Therefore, electric discharge P is not formed between the insulating layer 29 and the flow path portion 2. In addition, in the case where the voltage applied from the pulse power supply 8 is unipolar, electric charge is accumulated on the surface of the insulating layer 29. Thus the electric field between the insulating layer 29 and the flow path portion 2 is further reduced, and electric discharge P becomes unlikely to occur therebetween.

Similarly, since the electric field at each end portion in the length direction (the right-left direction in FIG. 8) of each high-voltage electrode 24 is relaxed by the potential of the second member 27, a uniform and strong electric field is formed at the opposing portion 24a, opposing the flow path portion 2, of each high-voltage electrode 24. As a result, uniform electric discharge P occurs between each high-voltage electrode 24 and the flow path portion 2. Meanwhile, the insulating layer 29 is provided on the flat surface portion 27a, opposing the flow path portion 2, of each second member 27. Thus a voltage drop occurs within the insulating layer 29, and the electric field at the surface, opposing the flow path portion 2, of the insulating layer 29 becomes smaller than the electric field at the opposing portion 24a, opposing the flow path portion 2, of each high-voltage electrode 24. Therefore, electric discharge P is not formed between the insulating layer 29 and the flow path portion 2. In addition, in the case where the voltage applied from the pulse power supply 8 is unipolar, electric charge is accumulated on the surface of the insulating layer 29. Thus the electric field between the insulating layer 29 and the flow path portion 2 is further reduced, and electric discharge P becomes unlikely to occur therebetween. Therefore, by relaxing the electric field at each end portion of the high-voltage portion 23 by the electric field relaxation portion 25, electric discharge P dose not concentrate at each end portion of the high-voltage portion 23, and uniform electric discharge P can be formed between the high-voltage portion 23 and the flow path portion 2. Thus the amount of the active species to be generated by electric discharge can be increased, and the amount of the active species to be supplied into the treatment target water can be increased.

In the present embodiment, the gap between the insulating layer 29 and the flow path portion 2 is smaller than the gap G between the high-voltage portion 23 and the flow path portion 2. And the end portions, in the length direction, of the opposing portions 24a of the high-voltage electrodes 24 are in contact (close contact) with the side surfaces of the second members 27. Therefore, even if droplets are formed on each high-voltage electrode 24 due to condensation, sprays, or the like, the droplets move via a contact portion between the high-voltage electrode 24 and the second member 27 to the insulating layer 29 located at the lower side, due to gravity or shock waves generated by electric discharge formation, and fall from the insulating layer 29 onto the flow path portion 2. Thus, occurrence of spark which is generated when droplets fall from the high-voltage electrode 24 can be suppressed.

In the present embodiment, the insulating layers 29 are provided on the flat surface portions 26a and 27a, opposing the flow path portion 2, of the first members 26 and the second members 27 and the side surface portions 26b and 27b at the side opposite to the high-voltage portion 23, but the structures are not limited thereto. The insulating layers 29 only need to be formed at least on the opposing portions 26f and 27f, opposing the flow path portion 2, of the first members 26 and the second members 27. In addition, by providing the insulating layers 29, the corrosion resistance of the first members 26 and the second members 27 can be improved. Moreover, the entire surfaces of the first members 26 and the second members 27 can be coated with insulating layers 29. By coating the entire surfaces of the first members 26 and the second members 27 with the insulating layers 29, exposure of the interfaces between the insulating layers 29, and the first members 26 and the second members 27 can be eliminated, and thus peeling of the insulating layers 29 from the first members 26 and the second members 27 due to corrosion at the interfaces can be suppressed.

The insulating layers 29 can be formed by an insulating material such as ceramics and resin. In particular, it is desirable that an insulating material having excellent corrosion resistance such as glass and fluorine resin is used as the material of the insulating layers 29. In addition, a voltage drop within the insulating layer 29 increases as the relative permittivity of the insulating layer 29 decreases. Thus, a material having a low relative permittivity is suitable. The thickness of the insulating layer 29 can be appropriately determined in accordance with various conditions such as the material of the insulating layer 29 and the structures of the first members 26 and the second members 27. Generally, it is desirable that the thickness of the insulating layer 29 is 0.1 mm to 10 mm. This is because: when the thickness of the insulating layer 29 is less than 0.1 mm, there is a high possibility that the insulating function is lost due to a scar during assembling or the like; and when thickness of the insulating layer 29 is more than 10 mm, it is difficult to form the insulating layer 29 on the first members 26 and the second members 27 by a general method such as thermal spraying or spraying, and the production cost for forming the insulating layers 29 increases. The insulating layers 29 can be formed by attaching plates formed by an insulating material, or the like to the first members 26 and the second members 27 by a mechanical method such as screwing. The insulating layers 29 may be formed by a multilayer structure including a plurality of insulating materials. One layer of the multilayer structure may be gas. The gas has a relative permittivity of nearly 1, and a voltage drop within the gas becomes large. Thus the effect of electric discharge suppression by the insulating layers 29 can be increased.

It is noted that, within the scope of the present invention, the above embodiments may be freely combined with each other, or each of the above embodiments may be modified or eliminated appropriately.

The invention claimed is:

1. A water treatment apparatus for performing water treatment by forming an electric field between a flow path portion on which treatment target water flows and a voltage application portion to which a high voltage is applied, and by generating electric discharge between the voltage application portion and the flow path portion, the water treatment apparatus comprising:
    an electric field relaxation portion disposed at an outer periphery of the voltage application portion so as to oppose the flow path portion and configured to form the electric field between the electric field relaxation portion and the flow path portion; and
    a power supply for applying a voltage to the voltage application portion and the electric field relaxation portion, wherein
    the electric field formed by the electric field relaxation portion when the voltage is applied is smaller than the electric field formed by the voltage application portion when the voltage is applied.

2. The water treatment apparatus according to claim 1, wherein the electric field relaxation portion is electrically connected to the voltage application portion and maintained at the same potential as the voltage application portion.

3. The water treatment apparatus according to claim 2, wherein a gap between the electric field relaxation portion and the flow path portion is larger than a gap between the voltage application portion and the flow path portion.

4. The water treatment apparatus according to claim 2, wherein the electric field relaxation portion has opposing portions closest to the flow path portion, and the opposing portions have flat surface portions that are lengthened in the predetermined direction, and round portions that are at both end portions, in a direction orthogonal to the predetermined direction, of the flat surface portions and that are obtained by rounding corners of the flat surface portions.

5. The water treatment apparatus according to claim 2, wherein the electric field relaxation portion is formed by a hollow material or a wire having a circular cross-sectional shape.

6. The water treatment apparatus according to claim 2, wherein the electric field relaxation portion is provided with an insulating layer on the opposing portion.

7. The water treatment apparatus according to claim 1, wherein a gap between the electric field relaxation portion and the flow path portion is larger than a gap between the voltage application portion and the flow path portion.

8. The water treatment apparatus according to claim 7, wherein the electric field relaxation portion has opposing portions closest to the flow path portion, and the opposing portions have flat surface portions that are lengthened in the predetermined direction, and round portions that are at both end portions, in a direction orthogonal to the predetermined direction, of the flat surface portions and that are obtained by rounding corners of the flat surface portions.

9. The water treatment apparatus according to claim 7, wherein the electric field relaxation portion is formed by a hollow material or a wire having a circular cross-sectional shape.

10. The water treatment apparatus according to claim 1, wherein the electric field relaxation portion and the voltage application portion are provided so as to be in contact with each other, and a gap between the electric field relaxation portion and the flow path portion is equal to or smaller than a gap between the voltage application portion and the flow path portion.

11. The water treatment apparatus according to claim 10, wherein the electric field relaxation portion has opposing portions closest to the flow path portion, and the opposing portions have flat surface portions that are lengthened in the predetermined direction, and round portions that are at both end portions, in a direction orthogonal to the predetermined direction, of the flat surface portions and that are obtained by rounding corners of the flat surface portions.

12. The water treatment apparatus according to claim 10, wherein the electric field relaxation portion is formed by a hollow material or a wire having a circular cross-sectional shape.

13. The water treatment apparatus according to claim 1, wherein the electric field relaxation portion has opposing portions closest to the flow path portion, and the opposing portions have flat surface portions that are lengthened in the predetermined direction, and round portions that are at both end portions, in a direction orthogonal to the predetermined direction, of the flat surface portions and that are obtained by rounding corners of the flat surface portions.

14. The water treatment apparatus according to claim 1, wherein the electric field relaxation portion is formed by a hollow material or a wire having a circular cross-sectional shape.

15. The water treatment apparatus according to claim 1, wherein the electric field relaxation portion is provided with an insulating layer on the opposing portion.

16. The water treatment apparatus according to claim 1, wherein the voltage application portion includes a plurality of high-voltage electrodes, a portion of each of the high-voltage electrodes that is closest to the flow path portion extends in a direction orthogonal to a direction of flow of the treatment target water, and the plurality of the high-voltage electrodes are disposed spacing from each other in the direction of flow.

17. The water treatment apparatus according to claim 16, wherein the electric field relaxation portion is provided so as to oppose both end portions, in the direction orthogonal to the direction of flow, of the voltage application portion.

18. The water treatment apparatus according to claim 16, wherein the electric field relaxation portion is provided so as to oppose the high-voltage electrodes located at both ends, in the direction of flow, of the voltage application portion.

19. The water treatment apparatus according to claim 16, wherein the high-voltage electrode has a thin shape.

20. A water treatment method to be performed by using the water treatment apparatus according to claim 1, the water treatment method comprising:
   forming electric discharge between the voltage application portion and the flow path portion while causing the treatment target water to flow on the flow path portion;
   bringing the treatment target water into contact with the electric discharge;
   supplying active species generated by the electric discharge into the treatment target water; and
   treating the treatment target water by the active species supplied into the treatment target water.

* * * * *